(12) United States Patent
Pitz et al.

(10) Patent No.: US 11,086,291 B2
(45) Date of Patent: Aug. 10, 2021

(54) METHOD FOR OPERATING A NUMERICALLY CONTROLLED PRODUCTION SYSTEM, AND PRODUCTION SYSTEM FOR SAME

(71) Applicant: Siemens Aktiengesellschaft, Munich (DE)

(72) Inventors: Thomas Pitz, Rutesheim (DE); Ralf Spielmann, Stuttgart (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/761,144

(22) PCT Filed: Oct. 11, 2018

(86) PCT No.: PCT/EP2018/077738
§ 371 (c)(1),
(2) Date: May 1, 2020

(87) PCT Pub. No.: WO2019/086226
PCT Pub. Date: May 9, 2019

(65) Prior Publication Data
US 2020/0341448 A1    Oct. 29, 2020

(30) Foreign Application Priority Data
Nov. 2, 2017   (EP) ...................................... 17199665

(51) Int. Cl.
*B23Q 15/10*     (2006.01)
*G05B 19/4155*   (2006.01)
*G05B 19/408*    (2006.01)

(52) U.S. Cl.
CPC ........... *G05B 19/408* (2013.01); *B23Q 15/10* (2013.01); *G05B 19/4155* (2013.01);
(Continued)

(58) Field of Classification Search
None
See application file for complete search history.

(56) References Cited

U.S. PATENT DOCUMENTS 3,573,854 A * 4/1971 Watson ................... G06F 9/381
712/237
2004/0138776 A1   7/2004 Baumann et al.
(Continued)

FOREIGN PATENT DOCUMENTS

DE   102015105436 A1   10/2016

OTHER PUBLICATIONS

PCT International Search Report and Written Opinion of International Searching Authority dated Dec. 14, 2018 corresponding to PCT International Application No. PCT/EP2018/077738 filed Oct. 11, 2018.

*Primary Examiner* — Ryan A Jarrett
(74) *Attorney, Agent, or Firm* — Henry M. Feiereisen LLC

(57) ABSTRACT

A numerically controlled production system is connected to a numerical controller, which includes a control program with successive program sets, and a look-ahead module which determines therefrom for successive clock-cycle points a movement profile with guidance variables for a movement axis prior to a movement. Subject to a condition, the control program includes program branching with multiple alternative control program sections, and determines which of the alternative control program sections is to be additionally executed subject to the condition. The look-ahead module calculates and stores an alternative movement profile for each alternative control program section prior to an additional movement, and holds the alternative movement profile available for the conditional program branching in order to carry out the additional movement.

8 Claims, 3 Drawing Sheets

(52) U.S. Cl.
CPC ........... *G05B 2219/34095* (2013.01); *G05B 2219/34101* (2013.01); *G05B 2219/35386* (2013.01)

(56) References Cited

U.S. PATENT DOCUMENTS

| | | |
|---|---|---|
| 2006/0229761 A1 | 10/2006 | Kita et al. |
| 2008/0294877 A1* | 11/2008 | Haga ................ G05B 19/4155 712/216 |
| 2017/0075341 A1 | 3/2017 | Nagashima |
| 2018/0032055 A1 | 2/2018 | Janssen et al. |
| 2018/0113436 A1* | 4/2018 | Shimizu ............... G05B 19/408 |

* cited by examiner

```
N100      ...
  :
N200      CASE (<Ausdruck>) OF
          <Konstante_1> GOTOF <Sprungziel_1>
          <Konstante_2> GOTOF <Sprungziel_2>
               :
          DEFAULT <Sprungziel_n>
  :
N800      ...
  :
```

METHOD FOR OPERATING A NUMERICALLY CONTROLLED PRODUCTION SYSTEM, AND PRODUCTION SYSTEM FOR SAME

CROSS-REFERENCES TO RELATED APPLICATIONS

This application is the U.S. National Stage of International Application No, PCT/EP2018/077738, filed Oct. 11, 2018, which designated the United States and has been published as International Publication No. WO 2019/086226 A1 and which claims the priority of European Patent Application, Serial No. 17199665.5, filed Nov. 2, 2017, pursuant to 35 U.S.C. 119(a)-(d).

BACKGROUND OF THE INVENTION

The invention relates to a method for operating a numerically controlled production system, in particular a machine tool, which is connected to a numerical controller, wherein a control program with successive control program sets is provided in the numerical controller, wherein the numerical controller comprises a look-ahead module, wherein from a plurality of successive control program sets prior to a movement the look-ahead module determines a movement profile for at least one movement axis, the profile comprising guidance variables for a path-time movement for the at least one movement axis for successive clock-cycle points, and wherein the control program comprises at least one program branching which is controlled by a condition and which comprises a plurality of successive alternative control program sections, said program branching determining which of the alternative control program sections is additionally run depending on the condition.

The invention also relates to a production system with a numerical controller.

Programming languages exist, which define the scope of the control capabilities, for movement definition of numerically controlled production systems, for example of cigarette filling systems or of systems, which move single, delicate products, but in particular also of machine tools, see DIN (ISO) 86025 for CNC controllers. A control program created in one such programming language comprises successive program sets, which represent a movement toward a target, including corresponding boundary conditions and also program sets without movement definition, such as forward feed specifications, details on the coordinate systems used, details on the dimension type, etc. The corresponding source text for the sets, also called G code, is binding for all controller manufacturers, although it can be supplemented or expanded by manufacturer-specific cycles or functions.

These programming languages and also their controller-specific expansions nowadays also offer the option of programming control instructions in the form of conditional program branchings, such as "switch/case", "if/then" etc., which is run only under a particular condition. The branching defines which of two or more successive alternative control program sections is run depending on one or more conditions.

Controllers of production systems, in particular also of machine tools, are typically designed as real-time controllers in order to be able to react quickly to relevant parameter changes. Examples of relevant parameter changes in connection with machine tools are the degree of wear of the tool, a determined quality of the workpiece before machining, adaptions of the machine tool to the environment, for example to the temperature, compensation of sagging of mechanical components of the machine tool mechanics, missing drilled holes, etc.

A typical implementation of the real-time controller is that a type of future is calculated in the controller. The term look-ahead is also common for this. Here, in advance or in preparation of/for the actual action, for example an axis movement for workpiece machining, all information necessary for this action is fully determined. It is then immediately and directly available in real time or at the machining time. For example, in a machine tool it is determined by way of a number of instructions of the parts program where a movement to be executed by the machine tool should go and with which dynamics this movement can be executed. How far into the future a controller computes depends on the controller itself, for example on the size of the memory provided for this purpose, the available performance and ultimately whether forced synchronizations between real time and future are necessary.

A forced synchronization is necessary if additional actions are dependent on a current state or a plurality of current states of the production system or the product to be produced.

While conditional program branchings in non-real-time software technology do not constitute a problem in the program sequence or program execution, conditional program branchings in real time create the problem that, depending on the condition of a program branching, a plurality of, but at least two, possible variants of future actions are possible.

In the case of the current controllers with real-time effect, the future is only calculated up to the decision instant of the next following condition of a conditional program branching. At the instant of the occurrence of the condition, and therewith after definition of the additional control program branch, a forced synchronization between real time and future is carded out. This forced synchronization has the drawback that the future of one of a plurality of alternative possible branches or program sections is only calculated when, on the basis of the decision, it is certain which branch or which program section is carded out for additional machining or for additional actions. Calculation of the future of the program section determined for machining results in a delay in execution. The program execution time is prolonged in the case of each program branching, in particular when a plurality of program branchings is provided in the program for machining, and in the end this adds up to a frequently not insignificant delay.

SUMMARY OF THE INVENTION

The object underlying the invention is to disclose a method for time-optimum operation of the numerically controlled production system mentioned in the introduction, even if the control program for operation of the production system comprises at least one conditional program branching.

The object underlying the invention is further to disclose a production system with a numerical controller, which is embodied for carrying out the operating method.

The first-mentioned object is achieved by a method mentioned in the introduction for operating a numerically controlled production system, which method is characterized in that the look-ahead module calculates an alternative movement profile for each alternative control program section prior to an additional movement, stores it, and holds it ready at the conditional program branching in order to carry out the additional movement.

The invention consists therefore in the "parallel" prior calculation of all possible movement profiles in the "near future" of the program sequence. In other words, it is a matter of the introduction of a "multi-program sequence technique", of a type of simultaneously occurring calculation of possible movement profiles after a conditional program branching. These movement profiles are provided at the instant of the request or the occurrence of the condition in order to carry out the additional movement. Depending on the condition, ultimately only the movement profile appropriate to the condition is activated for additional actions of the production system, however. The remaining movement profiles are discarded.

As a result of prior calculation of the movement profiles of all possible program branchings or of all possible alternative control program sections after a conditional program branching, no forced synchronization is necessary in the program sequence. The delay in the further execution of the control program caused due to forced synchronization is omitted therefore.

According to another advantageous feature of the invention at least one of the alternative control program sections comprises a further conditional program branching and for the one alternative parts program section, the look-ahead module calculates and stores the alternative movement profile in advance, up to the further conditional program branching and holds the alternative movement profile ready at the conditional branching in order to carry out the additional movement.

Since in the case of a plurality of conditional program branchings in the control program the possible movement profiles multiply greatly in the future, the movement profile is calculated only up to the next conditional program branching in the corresponding control program section. As soon as precisely this control program section is actually being executed on the basis of the current condition, the movement profiles are determined from the alternative control program sections following the additional conditional branching and are stored and held ready.

According to another advantageous feature of the invention, a maximum number of control program sets can be specified, which are taken into account by the look-ahead module in order to determine the movement profile. In general it is not necessary to determine the entire movement profile in advance. The controller has sufficient free computing capacity to determine the movement profile step-by-step further in the future during execution of the control program.

The condition is often controlled by values of a variable. According to another advantageous feature of the invention, the variable takes into account a quality criterion of a tool in the production system. In particular when the tool wears as a result of its use, the rate of wear is regularly detected. Once the wear limit is reached, a program-controlled exchange occurs. This applies, for example, to milling or drilling tools in a machine tool.

According to claim 6 another advantageous feature of the invention, the variable takes into account a state in the production system. One example of this is monitoring the temperature of a motor.

The second aforementioned object is achieved by a production system which is fitted with a numerical controller, which is embodied to carry out the method disclosed above.

BRIEF DESCRIPTION OF THE DRAWING

The properties, features and advantages of this invention described above and the manner in which they are achieved will become clearer and more comprehensible in conjunction with the following description of the exemplary embodiments, which are explained in more detail in connection with the drawings. Schematically in the drawings.

DETAILED DESCRIPTION OF PREFERRED EMBODIMENTS

Figure 1:
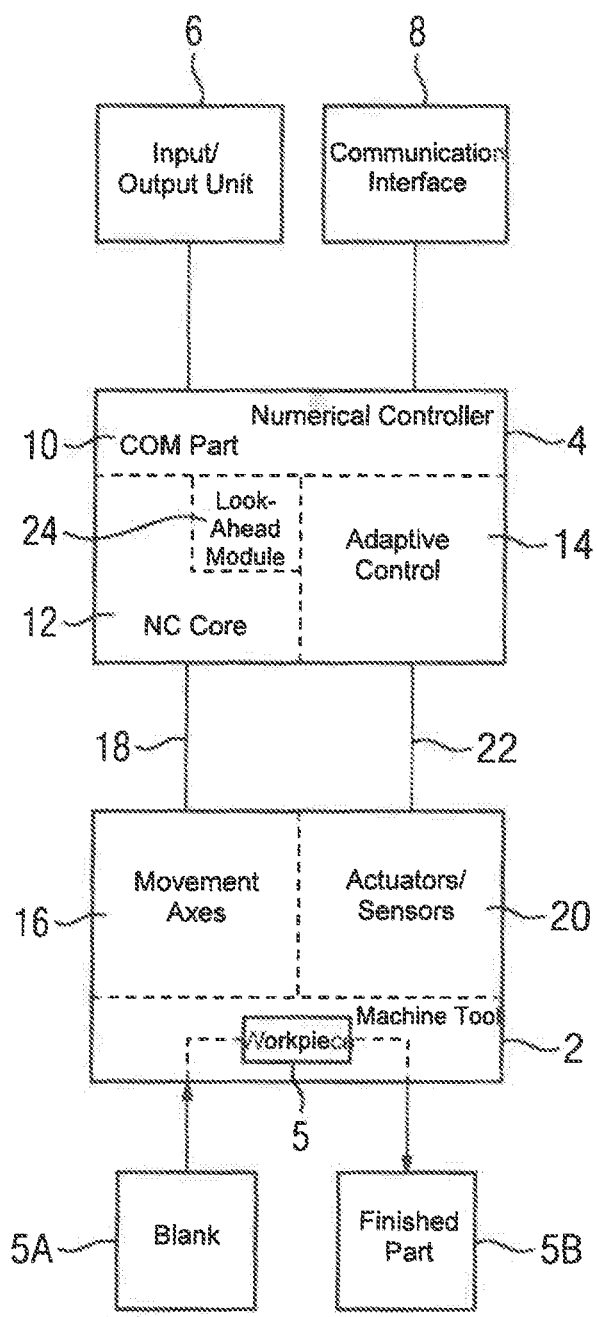
FIG. 1 shows in a block diagram the basic structure of a machine tool with a machine tool controller.

As an example of a production machine the block diagram in FIG. 1 shows a machine tool 2, which cooperates with a numerical machine tool controller 4 for machining a workpiece 5 from a blank 5A to a finished part 5B. Access of a user or operator to the machine tool controller 4 occurs by way of an input/output unit 6, which is also called an NC control panel or man-machine interface. A communications interface 8 is provided, moreover, which enables embedding of the numerically controlled machine tool 2 in a computer network; this operating mode is referred to as Distributed Numerical Control (DNC) in English.

The machine tool controller 4 is divided into three main function areas or main functionalities.

A first main function area, what is known as the COM part 10, fulfils communications functions with connected peripherals, such as input and output modules, sensors, limit switches and the like. The COM part 10 is used for communication with an input/output unit 6, moreover. Furthermore, it provides a programming environment, which comprises at least a program editor, but often also simulation and test mechanisms.

The second main functionality of the machine tool controller 4, a path control and interpolation and therewith the generation of desired movement values for the machine tool 2, is implemented in an NC core 12.

Finally, the third main functionality of the machine tool controller 4 is used for adaptive control 14, which is used to adapt the general movement control, based on the workpiece 5, from the NC core 12 to the specific machine tool 2. The adaptive control 14 comprises the control of actuators, detection of sensor signals, the implementation of monitoring functions, safeguarding of safety functions, etc. The adaptive control 14 is implemented by means of a PLC, in other words with a programmable logic controller.

During machining of the workpiece 5 with associated machine components, the machine tool 2 carries out movements in the space. The direction of movement of the machine components is defined by tool machine axes or movement axes 16. The data or signaling link of the machine tool controller 4 with the machine tool 2 is made in respect of the desired movement values for the movement axes 16 via first control lines 18 and in respect of actuators and sensors 20 in the machine tool 2 by way of binary inputs/outputs via second control lines 22.

The NC core 12 also comprises a look-ahead module 24. The look-ahead module 24 implements an anticipatory speed control for the movement axes 16. The look-ahead functionality optimizes the continuous path control operation in the machine tool 2. Uniform machining is necessary in order to attain high surface finishes on workpieces. Therefore, as far as possible there should be no fluctuations in the path speed during machining. Without look-ahead functionality the machine tool controller 4 considers only the movement set that immediately follows the current movement set or control program set in order to determine the possible path speed. If the following movement set includes only a short movement path, the machine tool controller 4 has to reduce the path speed (deceleration in the current movement set) in order to be able to potentially stop in good time at the end of the following set. By "looking ahead" at a parameterizable or adjustable number of movement sets, which follow the current movement set, a path speed that is sometimes significantly higher can be achieved with the look-ahead functionality since the machine tool controller 4 now has significantly more movement sets available to it for calculation. This results in the advantages of machining with, on average, a higher path speed and an improvement in the surface finish due to the avoidance of deceleration or acceleration operations.

This anticipatory speed control described above by way of example for a machine tool controller 4 is also advantageously used to control other production systems with high movement dynamics. The look-ahead functionality is therefore widely used, for example, also in robotics.

When machining the workpiece 5 from the blank 5A to the finished part 5B, the current state of the machined workpiece 5 or an operating state of the machine tool 2 must often be considered. Consideration occurs in such a way that the control program for additional machining requests relevant states of the workpiece 5 or the machine tool 2. The result of this request controls additional workpiece machining. In terms of program engineering the control program therefore includes conditional program branchings with a plurality of subsequently possible machining steps.

Figure 2:
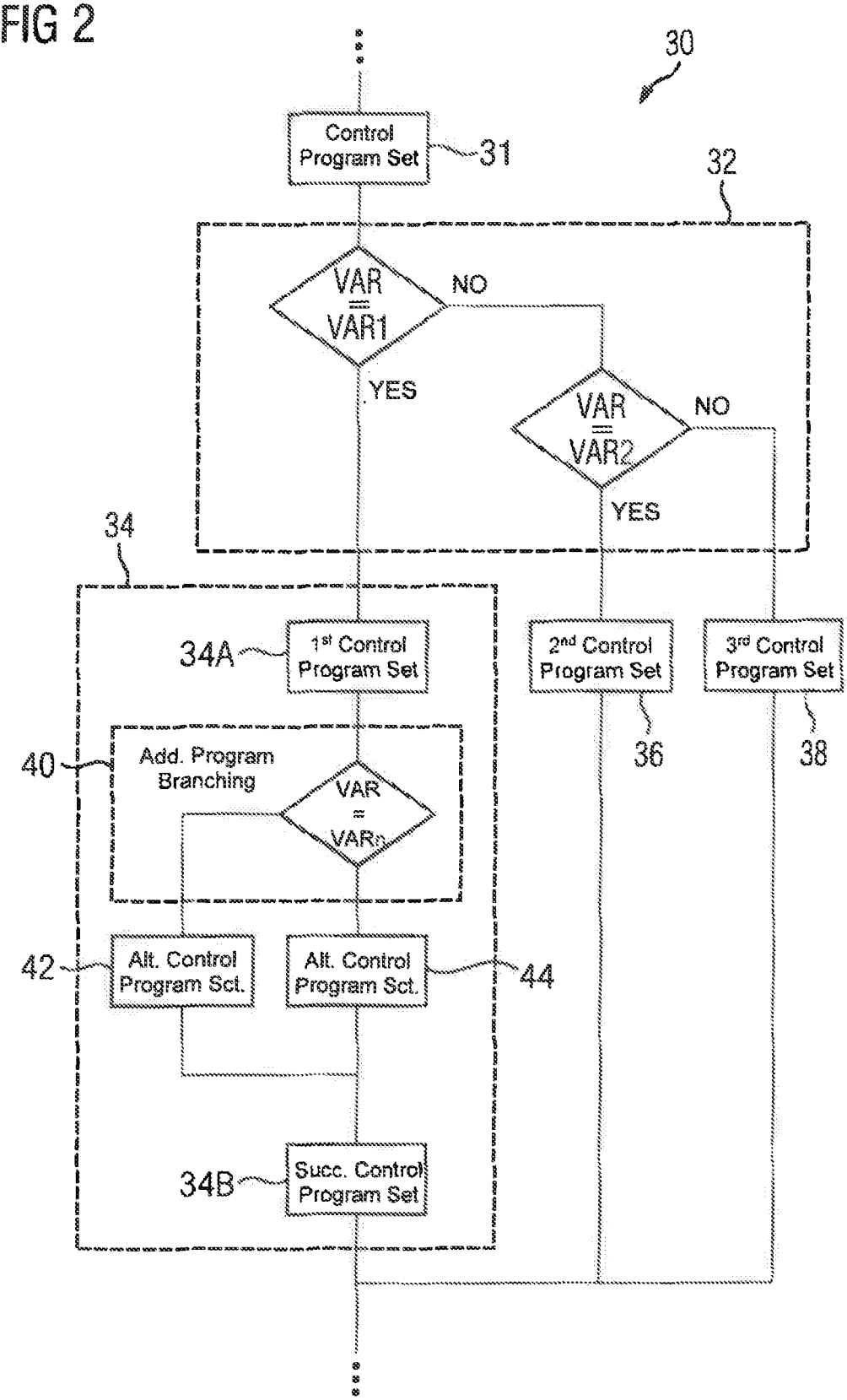
FIG. 2 shows a detail of a program flowchart of a control program with conditional program branchings.

FIG. 2 now shows as a program flowchart a detail of a control program 30. Up to a conditional program branching 32 the control program 30 comprises successive control program sets 31. The value of a variable VAR is requested in the conditional program branching 32. The value of the variables VAR stands for a particular workpiece or machine tool state.

If the variable VAR has the value VAR1, then a first alternative control program section 34 is subsequently executed. If the value of the variable VAR is not equal to VAR1, then it is queried whether the variable VAR has the value VAR2. If the variable VAR has the value VAR2, the second alternative control program section 36 is subsequently executed. If the value of the variable VAR is also not equal to VAR2 then the third alternative control program section 38 is executed. The corresponding procedure can of course also be expanded to more than three possible values of the variable VAR.

In addition to successive control program sets 34A and 34B the first alternative control program section 34 comprises an additional conditional program branching 40, containing additional alternative control program sections 42 and 44. As with the conditional program branching 32, the value of a (different) variable controls the further program sequence also in the case of the additional conditional program branching 40.

All successive program sets in the alternative control program sections 34, 36 and 38 are considered in the look-ahead module 24 up to a specified maximum number of control program sets when calculating the guidance variables of one or more movement axes 16. Solely in the first alternative control program section 34 are only the successive program sets 34A up to the additional conditional program branching 40 evaluated in the look-ahead module 24 in order to calculate and provide the guidance variables of the movement axes 16. If, on the basis of the value VAR1 of the variable VAR, the workpiece 5 is machined further in accordance with the control program sets in the alternative control program section 34, the movement profiles are also calculated in accordance with the additional alternative control program sections 42 and 44, stored and made available at the additional conditional program branching 40 for further machining, again in the look-ahead module 24.

Figures 3, 4:
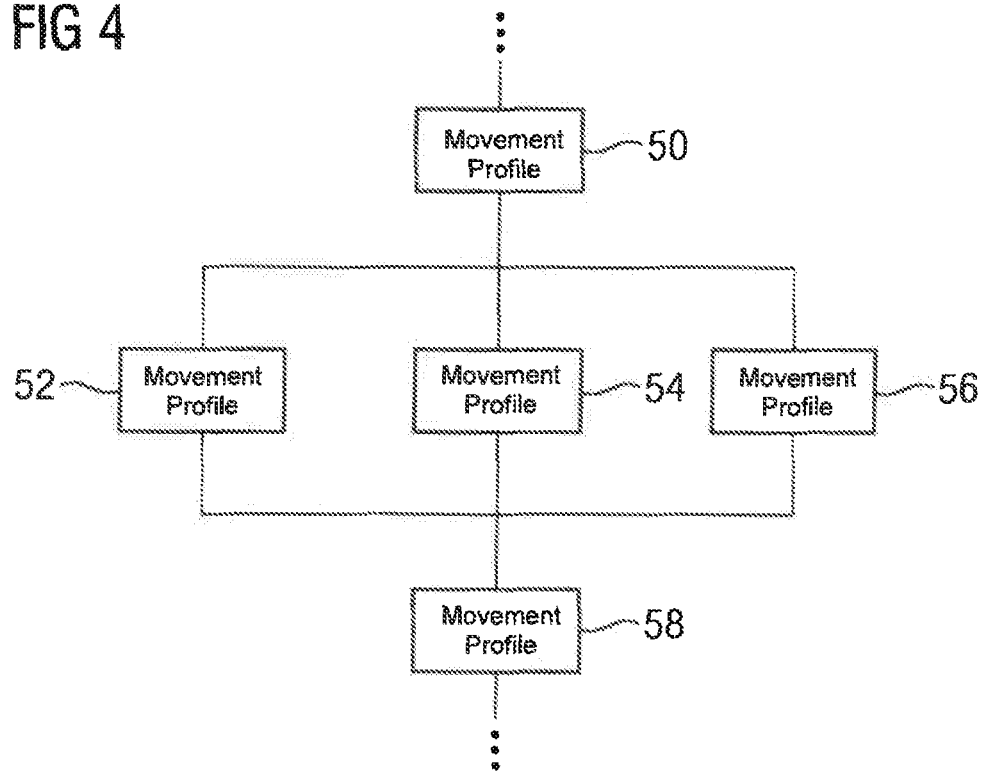
FIG. 3 shows a detail of a control program with a conditional program branching and with subsequent alternative control program sections and FIG. 4 shows a plurality of alternative movement profiles simultaneously calculated by the look-ahead module after a conditional program branching.

FIG. 3 shows an example of one syntax of a conditional branching possible in a program set, which is referred to there as a CASE function. It provides the possibility of checking the current value (type: INT) of a variable or a computing function, referred to there as <Expression>, and, depending on the result, which is referred to as <Constant_1>, <Constant_2> etc., of jumping to different positions, referred to there as <Jump destination_1>, <Jump destination_2>, . . . , <Jump destination_n>, in the control program.

In detail the conditional program branching (CASE . . . OF . . . DEFAULT) in FIG. 3 has the following meaning:
CASE: initiates the jump instruction.
<Expression>: stands for the variable or computing function,
OF: first stated value for the variable or computing function,
<Constant_1>: first stated value for the variable or computing function.
<Constant_2>: second stated constant value for the variable or computing function.
DEFAULT: For the oases where the variable or computing function does not assume any of the stated constant values, a jump destination can be determined using the DEFAULT instruction. If the DEFAULT instruction is not programmed, the set following the CASE instruction becomes the jump destination in these cases:
GOTOF: Jump instruction with jump destination in the direction of the program end.
<Jump destination_1>: The method branches to this jump destination if the value of the variables or computing function matches the first stated constant.
<Jump destination_2>: The method branches to this jump destination if the value of the variables or computing function matches the second stated constant.
<Jump destination_n>: The method branches to this jump destination if the value of the variables or computing function does not assume any of the stated constant values.

A practical application of a conditional branching in conjunction with large-scale production shall be described below.

In order to provide a hole in a workpiece with a thread, the latter has to be rough-machined/pre-drilled. What is known as a core hole is drilled using a particular drill bit. A thread is then cut/drilled into the core hole using a screw tap. The screw tap would be destroyed if the core hole is not provided or was only inadequately created.

As the screw tap is run into the expected core hole, the forward feed flow of the involved movement axes 16, for example the Z-axis on a drill, is checked in real time. If this is too high then this means that core hole is not provided or has been only inadequately drilled. In this case the screw tap would be destroyed.

At the location in the control program 30 at which measurements and decisions are made, it is necessary to program a conditional program branching for the subsequent states:

State A: The flow is in a normal range; it is not high. This is an indication that the core hole is provided. Machining of the workpiece continues as normal.

State B: The flow is high. This is an indication that the core hole is missing. Machining of the workpiece proceeds in a fault branch.

Two states are in turn conceivable in the fault branch, and these relate to the machining tool.

State C: The length of the core hole drill bit still lies in the permissible wear range. For further machining, the workpiece is parked for subsequent machining.

State D: The wear limit of the core hole drill bit is reached or exceeded. The workpiece machined therewith is discarded.

FIG. 4 illustrates a plurality of movement profiles, which were calculated with the aid of the look-ahead module 24 prior to the movement itself from successive program sets of alternative program sections, and stored. Reference is made in this connection to the flowchart in FIG. 2.

As already disclosed in the introduction, for successive clock-cycle points the movement profile comprises guidance variables for path-time movement of one or more movement axes 16 of the machine tool 2.

A first movement profile 50 is calculated using the look-ahead module 24 from the successive control program sets 31, which are to be executed prior to the conditional program branching 32. Prior to reaching the conditional program branching 32, in other words prior to the querying to be carried out there of the tool and/or machine tool states, alternative movement profiles 52 or 54 or 56 have likewise already been calculated from the alternative control program sections 34, 36 and 38 by the look-ahead module 24. However, as already described above, only the successive control program sets 34A of the control program section 34 are considered for the movement profile 52.

The movement profile 50 conditional for future machining of the workpiece is stored together with the movement profiles 52, 54, 56, which are to be potentially used in the future, in a program memory (not shown here) of the look-ahead module 24. If the maximum number of control program sets to be evaluated by the look-ahead module 24 has not yet been reached, a movement profile 58 is likewise calculated from the control program sets to be executed after the alternative control program sections 34, 36, 38, and stored in the program memory. The movement profiles 50, 52, 54, 56 and optionally 58 are therefore available for controlling the machine tool 2. As a result, machining of the workpiece 5 can be continued without delay at the conditional program branching 32. If, for example, due to the value of the variable VAR not being equal to VAR1 or VAR2, the third alternative control program section 38 is specified for machining, then the movement profile 56 is executed after the movement profile 50 without waiting time. The movement profiles 52 and 54 are discarded in this case, are deleted from the program memory therefore. After the movement profile 56, the additional guidance variables of the movement axes 16 are then specified by the movement profile 58.

To summarize, the present invention therefore relates to the following facts:

A numerically controlled production system, in particular a machine tool 2, is connected to a numerical controller 4. A control program with successive program sets is provided in the numerical controller 4. The numerical controller 4 comprises a look-ahead module 24, which from a plurality of successive control program sets 31 prior to a movement determines a movement profile 50 for at least one movement axis 16, the profile comprising guidance variables for a path-time movement for the at least one movement axis 16 for successive clock-cycle points. The control program comprises at least one program branching 32, 40 which is controlled by a condition and which comprises a plurality of successive alternative control program sections 34, 36, 38, said program branching determining which of the alternative control program sections 34, 36, 38 is additionally run depending on the condition. The look-ahead module 24 calculates an alternative movement profile 52, 54, 56 for each alternative control program section 34, 36, 38 prior to an additional movement, stores it, and holds it ready at the conditional program branching 32, 40 in order to carry out the additional movement.

The present invention has many advantages. In particular it is possible, even with conditional program instructions, to ensure a continuous execution of the control program 30.

Although the invention has been illustrated and described in more detail by the preferred exemplary embodiment, it is not limited by the disclosed examples and a person skilled in the art can derive other variations herefrom without departing from the scope of the invention.

What is claimed is:

1. A method for operating a numerically controlled production system, which is connected to a numerical controller which has a control program comprising successive control program sets and a look-ahead module, the method comprising:
generating, prior to a movement, with the look-ahead module from several successive control program sets for at least one movement axis a movement profile, which comprises guidance variables for a path-time movement for the at least one movement axis for successive clock-cycle points;
determining with the control program at least one program branching having a plurality of successive alternative control program sections controlled by a condition, with the condition specifying which of the alternative successive control program sections is to be executed depending on the condition; and
with the look-ahead module, calculating, prior to performing an additional movement, an alternative movement profile for each of the alternative successive control program sections, storing the alternative movement profile, and having the alternative movement profile ready at the conditional program branching for carrying out the additional movement.

2. The method of claim 1, wherein at least one of the alternative successive control program sections comprises an additional conditional program branching, and wherein the look-ahead module calculates in advance the alternative movement profile for the at least one alternative successive control program section, stores the alternative movement profile, and has the alternative movement profile ready at the conditional program branching for carrying out the additional movement.

3. The method of claim 1, further comprising specifying a maximum number of control program sets, which are taken into account by the look-ahead module to determine the movement profile or the alternative movement profile.

4. The method of claim 1, further comprising controlling the condition based on values of a variable.

5. The method of claim 4, wherein the variable takes into account a quality criterion of a tool in the production system.

6. The method of claim 4, wherein the variable takes into account a state in the production system.

7. The method of claim 1, wherein production system comprises a machine tool.

8. A production system, comprising:
a machine tool for machining a workpiece;
a numerical controller cooperating with the machine tool and having a control program comprising successive control program sets for path control and interpolation of the machine tool; and
a look-ahead module,
wherein the look-ahead module is configured to
generate, prior to a movement, from several successive control program sets for at least one movement axis a movement profile, which comprises guidance variables for a path-time movement for the at least one movement axis for successive clock-cycle points, determine with the control program at least one program branching having a plurality of successive alternative control program sections controlled by a condition, with the condition specifying which of the alternative successive control program sections is to be executed depending on the condition, and calculate, prior to performing an additional movement, an alternative movement profile for each of the alternative successive control program sections, store the alternative movement profile, and have the alternative movement profile ready at the conditional program branching for carrying out the additional movement.

* * * * *